(12) United States Patent
Goel et al.

(10) Patent No.: US 11,931,695 B2
(45) Date of Patent: Mar. 19, 2024

(54) HYDROPHOBIC MEMBRANES AND MEMBRANE DISTILLATION METHODS

(71) Applicant: ENTEGRIS, INC., Billerica, MA (US)

(72) Inventors: Vinay Goel, Acton, MA (US); Jad A. Jaber, Westford, MA (US); Saksatha Ly, Lexington, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/232,416

(22) Filed: Apr. 16, 2021

(65) Prior Publication Data
US 2021/0322925 A1 Oct. 21, 2021

Related U.S. Application Data

(60) Provisional application No. 63/010,831, filed on Apr. 16, 2020.

(51) Int. Cl.
| | |
|---|---|
| *B01D 69/02* | (2006.01) |
| *B01D 3/14* | (2006.01) |
| *B01D 61/36* | (2006.01) |
| *B01D 71/56* | (2006.01) |
| *C02F 1/44* | (2023.01) |
| *C02F 101/32* | (2006.01) |

(52) U.S. Cl.
CPC ........... *B01D 61/364* (2013.01); *B01D 3/145* (2013.01); *B01D 61/366* (2013.01); *B01D 69/02* (2013.01); *B01D 71/56* (2013.01); *C02F 1/447* (2013.01); *B01D 2325/02* (2013.01); *B01D 2325/04* (2013.01); *B01D 2325/36* (2013.01); *B01D 2325/38* (2013.01); *C02F 2101/322* (2013.01)

(58) Field of Classification Search
CPC .. B01D 61/366; B01D 71/56; B01D 2325/36; B01D 2325/38
See application file for complete search history.

(56) References Cited

U.S. PATENT DOCUMENTS

| | | |
|---|---|---|
| 2011/0031100 A1 | 2/2011 | Qtaishat |
| 2013/0319924 A1 | 12/2013 | Tee |
| 2015/0129496 A1* | 5/2015 | Sanguineti ........... B01D 69/125 210/500.36 |
| 2015/0360184 A1 | 12/2015 | Qtaishat |

FOREIGN PATENT DOCUMENTS

| | | |
|---|---|---|
| WO | 2009029719 A1 | 3/2009 |
| WO | 2017161241 A1 | 9/2017 |

OTHER PUBLICATIONS

Han, Bingjun, et al. "Determination of surface energy parameters of hydrophilic porous membranes via a corrected contact angle approach." Langmuir 35.47 (2019): 15009-15016. (Year: 2019).*

* cited by examiner

*Primary Examiner* — Bradley R Spies

(57) ABSTRACT

Described are methods of membrane distillation for processing organic liquids, hydrophobic distillation membranes useful for membrane distillation methods, and methods of preparing the hydrophobic distillation membranes.

7 Claims, 6 Drawing Sheets

HYDROPHOBIC MEMBRANES AND MEMBRANE DISTILLATION METHODS

CROSS-REFERENCE TO RELATED APPLICATION

This application claims priority to and the benefit of U.S. Provisional Application No. 63/010,831 filed on Apr. 16, 2020, which is incorporated herein by reference in its entirety for all purposes.

TECHNICAL FIELD

The following description relates to methods of membrane distillation for processing organic liquids, to hydrophobic membranes useful for membrane distillation methods, and to methods of preparing the hydrophobic membranes.

BACKGROUND

Membrane distillation is a specific type of a distillation method that operates by distilling a liquid through a non-wetted porous membrane, a "distillation membrane," which is generally hydrophobic to prevent the membrane from becoming wetted. Conventional distillation methods are performed by causing a liquid to vaporize, e.g., by heating, then collecting vapor that is produced. Like conventional distillation methods, membrane distillation method use thermodynamic forces (temperature and vapor pressure differences) to cause evaporation of a liquid.

Membrane distillation methods, and membranes used in membrane distillation methods, are used for processing aqueous liquids, predominantly to purify water, e.g., to desalinate seawater. The aqueous liquid, and water vapor derived from the aqueous liquid, contact a porous hydrophobic membrane that has a surface energy that is not wetted by the aqueous liquid. Because the membrane is porous, the water molecules that are in vapor form are able to pass through the membrane. Other less volatile molecules of the aqueous liquid, e.g., metal ions, that remain in the liquid phase, do not pass through the membrane. A result is that water from the aqueous liquid passes through the membrane in a relatively or highly pure form, and is separated from the original liquid (e.g., salt water).

The predominant use of membrane distillation methods is to purify water, e.g., to desalinate seawater. In an alternate application, membrane distillation methods have been described for processing aqueous solutions that contain ammonia. See Duong et al., Water and Environmental Journal 28 (2013) pp. 425-434. See also Lawson et al., Membrane Distillation, J. Membrane Sci. 124 (1997) 1-25.

SUMMARY

Many volatile organic liquids are used in industry, and are required to be relatively or highly pure, free from certain levels of contaminants and impurities. One general type of volatile organic liquid feed that is commonly used is the type of organic liquid used as an organic cleaning liquid, one example of which is isopropyl alcohol. Isopropyl alcohol is widely used for cleaning and drying components, filters, and for processing wafers in the semiconductor industry. To be useful in this manner, isopropyl alcohol should contain a low level of metals and a low level of non-volatile organic contaminants. Either of these types of contaminants can leave a residue on a wafer surface upon evaporation of the isopropyl alcohol.

Dissolved metals and non-volatile organic residues are often present in an isopropyl alcohol, and must be removed prior to use in certain semiconductor applications. One current technique for removing impurities is by processing with an ion-exchange membrane. A negatively charged membrane may be effective to remove dissolved metals from a liquid such as isopropyl alcohol. However, such membranes are only marginally effective in removal of organic residue from the isopropyl alcohol.

Membrane distillation is useful for enabling separation of a desired material from a feed liquid to enhance the purity of the desired material. According to examples of described membrane distillation methods, a liquid feed composition ("liquid feed") that contains volatile organic liquid is processed by a membrane distillation method. The method uses a hydrophobic membrane, meaning a porous distillation membrane that has at least a hydrophobic surface. The liquid feed placed in contact with the hydrophobic surface of the hydrophobic distillation membrane, but does not wet the hydrophobic surface. One or more volatile organic components of the liquid feed will contact the hydrophobic membrane surface, as a vapor, and are allowed to pass through the membrane in vapor form. Less volatile or non-volatile components of the liquid feed remain in the liquid phase and do not pass through the membrane.

The hydrophobic distillation membrane will have a surface that is hydrophobic or that is strongly hydrophobic, to prevent the feed liquid from wetting the surface during processing.

As used herein, a "surface energy" (surface free energy) of a surface is considered to be equal to a surface tension of highest surface tension liquid that will wet the surface within two seconds of contact (see Example 3, Surface Energy Measurement) (also referred to as a "wetting liquid surface tension" test, or a "standard liquid" test). A useful or preferred distillation membrane that is "hydrophobic" will have a surface energy that is below 50, such as below 40, 30, 20, 25, 22, 21, or 20 mN/m, measured as a surface tension of a highest surface tension liquid that will wet the surface within two seconds, as described in Example 4.

The hydrophobic surface is prepared by adding fluorinated groups to a surface of a base membrane. The base membrane surface may be hydrophilic (e.g., have a surface energy of at least 47 or 50 mN/m) before the fluorinated groups are added to the surface.

As used herein, the term "base membrane" refers to a porous polymeric membrane that includes a surface to which fluorinated material is applied to produce a hydrophobic membrane as described. A useful or preferred base membrane may have a hydrophilic surface. The hydrophilic surface may be a result of a base membrane being prepared from hydrophilic polymer such as nylon, which causes the base membrane surface to be hydrophilic prior to adding the fluorinated groups to the base membrane surface.

Alternately, a base membrane having a hydrophilic surface may be one that comprises hydrophobic polymer such as a polyolefin (e.g., such that the membrane exhibits a surface energy that is below 40 mN/m), and that is processed to increase the surface energy, e.g., hydrophilized. According to certain examples of hydrophobic membranes and methods of making hydrophobic membranes, fluorinated groups are preferably not added to a membrane surface that has a surface energy that is below 40 mN/m. However, a base membrane may be made from a membrane that comprises hydrophobic polymer, e.g., a membrane that exhibits a surface energy that is below 40 mN/m, and that is hydrophilized to increase surface energy of the membrane to above 40 mN/m, e.g., to at least 42, 47, 50, 60, or 70 mN/m.

As used herein, a membrane (e.g., a "base membrane") is considered to be "hydrophilic" if the membrane has a surface energy that is greater than 40 mN/m, e.g., greater than 50, 60, or 70 mN/m, measured as a surface tension of a highest surface tension liquid that will wet the surface within two seconds.

In one aspect, the disclosure relates to a method of processing a liquid feed that contains volatile organic liquid. The method includes: providing liquid feed that contains volatile organic liquid; contacting a flow of the liquid feed with a hydrophobic surface of a hydrophobic distillation membrane on a retentate side of the membrane, wherein the liquid feed does not wet the hydrophobic surface; causing the volatile organic liquid to pass as vapor through the membrane to a permeate side of the membrane; and collecting the vapor on the permeate side of the membrane.

In another aspect, the disclosure relates to a hydrophobic distillation membrane having a hydrophobic surface. The membrane comprises: a base membrane comprising a base membrane surface having a surface energy of at least 47 mN/m, and fluorinated groups added at the base membrane surface to produce the hydrophobic surface, the hydrophobic surface having a surface energy below 47 mN/m.

In yet another aspect, the disclosure relates to a method of preparing a hydrophobic distillation membrane. The method includes providing a base membrane comprising a base membrane surface having a surface energy of at least 30 mN/m, and adding fluorinated groups to the base membrane surface to reduce the surface energy to below 25 mN/m.

DETAILED DESCRIPTION

Figure 1:
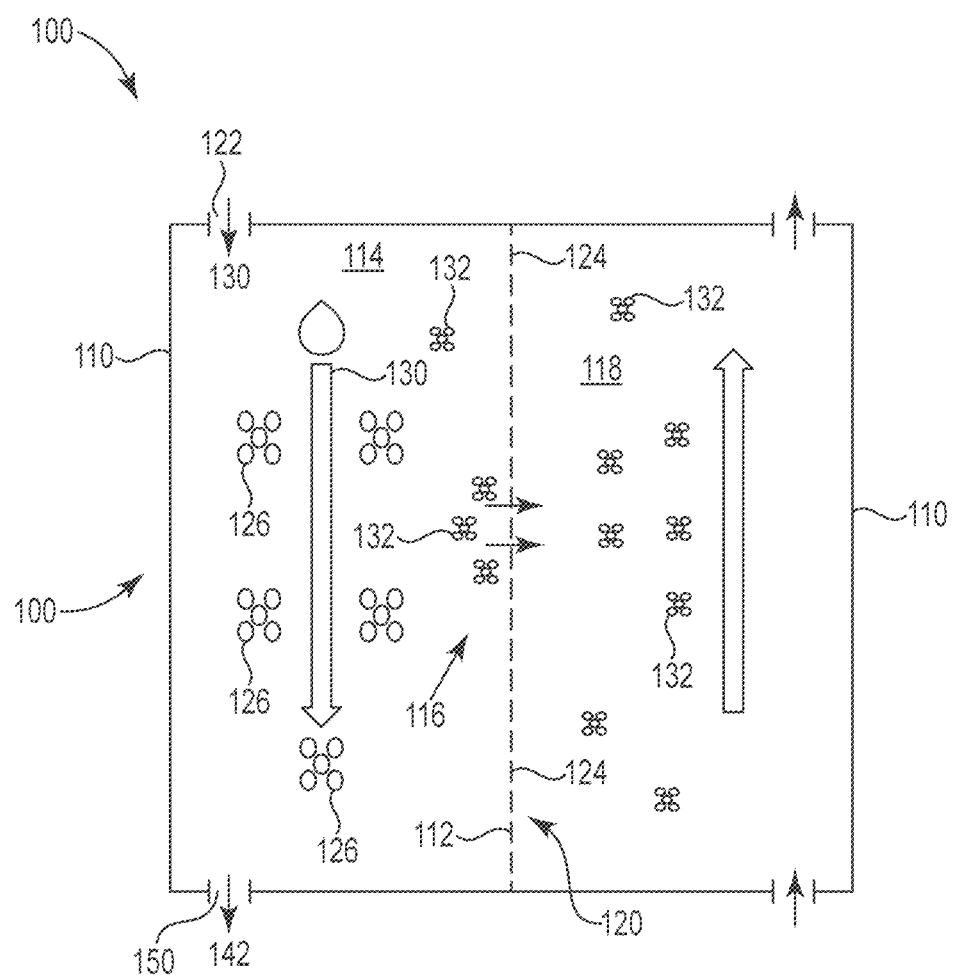
FIG. 1 illustrates an example system and method for membrane distillation as described.

The following description relates to membrane distillation methods that use a hydrophobic membrane to separate components of a liquid feed. The description also relates to hydrophobic membranes that include a hydrophobic surface that includes fluorinated groups added to the surface, and to methods of preparing hydrophobic membranes by adding fluorinated groups to a porous membrane surface.

According to described membrane distillation methods, generally, a liquid feed composition ("liquid feed") is processes using a hydrophobic membrane, meaning a porous distillation membrane that has at least a hydrophobic surface. The liquid feed contains at least one volatile organic liquid. The liquid feed is brought into contact with the hydrophobic surface of the hydrophobic distillation membrane ("hydrophobic membrane"), but does not wet the hydrophobic surface. Volatile (vapor-forming) organic components of the liquid feed that are present at the interface between the liquid and the hydrophobic surface are allowed to pass through the membrane in vapor form, while less volatile or non-volatile components of the liquid feed remain in the liquid phase and do not pass through the membrane.

In somewhat more detail, a flow of the liquid feed is contacted with a hydrophobic surface of a hydrophobic distillation membrane on one side (a retentate side) of the membrane. The surface energy of the hydrophobic surface of the membrane is lower than the surface tension of the liquid feed. The liquid feed does not wet the hydrophobic surface, even under operating conditions that may include pressure and elevated temperature. At the interface between the membrane surface and the liquid surface, the liquid feed produces a vapor of volatile organic liquid that is part of the liquid feed. The vapor is derived from one or more volatile components of the liquid feed, e.g., one or a combination of two or more volatile organic liquids contained in the liquid feed. Because the liquid feed does not wet the surface of the membrane, molecules of the vapor of the volatile components of the liquid feed are allowed to enter pores of the membrane and pass through the membrane as a vapor. Upon passing through the membrane to an opposite side of the membrane (a permeate side of the membrane), the vapor is collected. Non-volatile components or components that have a lower relative volatility that are also present in the liquid feed, and that do not form a vapor, do not pass through the membrane.

Compared to previous membrane distillation methods, which have been used to process aqueous liquids as a liquid feed, and that involve water vapor passing through a porous hydrophobic distillation membrane, methods as described herein can be used to process a liquid feed that contains a substantial amount of volatile organic liquid, and can operate by allowing organic vapor derived from the volatile organic liquid (as opposed to water vapor) to pass through the hydrophobic distillation membrane.

Examples of useful or preferred liquid feed compositions may contain at least one volatile organic liquid in a substantial amount, e.g., at least 20 or 30 weight percent, such as up to or in excess of 40, 50, 60, 70, 80, 90, or 95 weight percent of volatile organic liquid based on total weight liquid feed. A liquid feed may contain a single type of volatile organic liquid in an amount within these ranges, e.g., a single type of organic solvent such as isopropyl alcohol. Alternately, a liquid feed may contain two or more different types of volatile organic liquids in a total amount that is within these ranges, e.g., an organic solvent such as isopropyl alcohol in combination with another organic solvent in a total amount that is within one of these ranges.

The term "volatile organic liquid" is used herein in manner that is consistent with the meaning of this term in the chemical arts, e.g., to include any organic compound that can be in a form of a liquid, and that forms a vapor, e.g., at room temperature. Examples of volatile organic liquids include organic solvents that may be used to dissolve another substance (e.g., as a solvent to dissolve a solute), to disperse other substances and form a processing liquid or a coating, as medium for a chemical reaction, as a cleaning agent, as well as other known uses. Without limiting the present disclosure, an organic liquid that is considered to be a "volatile organic liquid" may have a boiling point (at atmospheric pressure) that is lower than 150 degrees Fahrenheit (or 65.6 degrees Celsius), e.g., that is below 130, 120, 100, 90, 80, or 70 degrees Fahrenheit (54.4, 48.9, 37.8, 32.2, 26.7, or 21.1 degrees Celsius). Examples of boiling points of volatile organic liquids include: a boiling point of 80.3 degrees Fahrenheit (26.8 degrees Celsius) (isopropyl alcohol); a boiling point of 64.5 degrees Fahrenheit (18.1 degrees Celsius) (methanol); and a boiling point of 56.1 degrees Fahrenheit (13.4 degrees Celsius) (acetone); a boiling point of 80.4 degrees Fahrenheit (26.9 degrees Celsius) (benzene); and a boiling point of 111 degrees Fahrenheit (43.4 degrees Celsius) (toluene).

Examples of specific types of volatile organic liquids include, generally, hydrocarbon compounds that contain a one or more carbon atoms with attached hydrogen atoms and optional non-carbon, non-hydrogen substituents such as oxygen, nitrogen, sulfur, or a halogen. The compound may be saturated or unsaturated (e.g., contain one or more double-bonds). Examples include: aromatic compounds such as benzene, turpentine, and toluene; saturated alkanes such as hexane and heptane; lower alcohols such as methanol, ethanol, butanol, isopropanol; esters and ethers such as hydrofluoroethers, diethyl ether; ketones such as acetone and methyl-ethyl ketone (MEK); amines; nitrated and halogenated hydrocarbons such as tetrachloroethylene; as well as others.

A volatile organic liquid that is contained in a liquid feed can preferably have a surface tension (measured separate from the liquid feed) that is below the surface tension of water, e.g., that is below 50, 40, 30, 25, or 22 mN/m, measured at standard temperature and pressure conditions. The volatile organic liquid should have a surface tension that, under non-operating conditions, i.e., conditions outside of a membrane distillation process (e.g., at standard temperature and pressure), does not allow the volatile organic liquid to wet a surface of a hydrophobic membrane used in a membrane distillation method as described, either if the volatile organic liquid is contacted in a pure form with the surface or if the volatile organic liquid is part of a liquid feed. Moreover, during a membrane distillation process, at operating conditions that may include elevated temperature, elevate pressure, or both, the volatile organic liquid should not wet a surface of a hydrophobic membrane used in a membrane distillation method as described, either if the volatile organic liquid is contacted in a pure form with the surface, or if the volatile organic liquid is a component of a liquid feed.

The liquid feed may contain other organic or inorganic materials such as: water, contaminants (e.g., dissolved metal, non-volatile organic residue, or the like), inorganic non-aqueous materials (e.g., solvents) such as liquid ammonia, acid, base. For example, a liquid feed may contain an amount of water that is up to or in excess of 20, 40, or 50 weight percent water based on total weight liquid feed.

The liquid feed will have a surface tension that is below a surface tension of water. Depending on the composition of the liquid feed, the surface tension of the liquid feed may be below 50, 40, 30, 25, 22, 21, or 20 mN/m, measured at standard temperature and pressure conditions.

Depending on the source and use (commercial application) of the liquid feed, for example if the liquid feed has been used in a commercial manufacturing process, the liquid feed may contain various types of impurities such as dissolved metals, non-volatile organic residues, other inorganic residues, etc. As an example, a liquid feed may contain one or more dissolved metals in any amount, such as in an amount of from 0.1 parts per billion (ppb) to 100 ppb. As another example, a liquid feed may contain non-volatile organic residue, in any amount, depending on the source and use of the liquid feed. A membrane and method as described may be used with liquid feed that contains an amount of non-volatile organic residue in an amount in a range from 0.1 to 10 weight percent, e.g., from 0.5 to 1, 2, or 5 weight percent based on total weight liquid feed. In other applications, a liquid feed may contain a substantially lower amount of non-volatile organic residue, e.g., an amount in a range from 1 or 10 to 5,000 parts per million (ppm), e.g., from 50 or 100 to 1,000 or 2,500 ppm.

A specific example of a liquid feed composition that may be processed by a membrane distillation method as described is an isopropyl alcohol cleaning solution, e.g., of a type that is used for evaporative cleaning of semiconductor wafers. This type of liquid feed may contain a substantial amount of isopropyl alcohol in combination with amounts of one or more dissolved metals, an amount of non-volatile organic residue, and possibly an amount of water. The amount of isopropyl alcohol may be at least 40 or 50 weight percent, e.g., up to or in excess of 55, 60, 70, 80, 90, 95, 98, or 99 weight percent isopropyl alcohol based on total weight liquid feed. The amount of water may be below 40 weight percent, e.g., less than, 30, 20, 10, 5, 2, or 1 weight percent water based on total weight liquid feed. One or more dissolved metals may be present in an amount from 0.1 parts per billion (ppb) to 100 ppb total dissolved metal or metals. Non-volatile organic residue may be present in an amount in a range from 1 or 10 to 5,000 parts per million (ppm), e.g., from 50 or 100 to 1,000 or 2,500 ppm, based on total weight liquid feed.

Non-limiting examples of non-volatile organic residues that may be included in an isopropyl alcohol cleaning solution include nonpolar C12-C30 compounds, dodecene, diisoprpyletylamine, tetramethyl benzidine, nonanol, amines (e.g., heptanamine, trimethylamine, N—N-diisopropylethylamine), ketones (e.g., 2-pentanone, acetone), alcohols (e.g., tertiary-butyl alcohol, ethanol), 3,3',5,5'-tetramethylbenzidine and non-polar compounds (e.g., dodecene, and C14 and higher non-polar linear hydrocarbons).

According to an example of a method of processing a liquid feed in the form of an isopropyl alcohol cleaning solution (that has been used in wafer cleaning process), the cleaning solution contains mostly isopropyl alcohol, e.g., at least 90, 95, 98, or 99 weight percent isopropyl alcohol, with dissolved metals, non-volatile organic residue, and essentially no water (e.g., less than 0.5 or 0.1 weight percent water). A flow of the isopropyl alcohol cleaning solution is contacted with a hydrophobic surface of a hydrophobic distillation membrane on one side (a retentate side) of the membrane. The surface energy of the membrane can be below 22, 21, or 20 mN/m, and below the surface tension of the isopropyl alcohol cleaning solution, which may be approximately 21 or 22 mN/m. The isopropyl alcohol cleaning solution may be heated (e.g., to a temperature in a range from 20 to 78 degrees Celsius), and may be under pressure during contact with the surface of the hydrophobic membrane. Under such operating conditions, the isopropyl alcohol cleaning solution does not wet the contacted surface of the hydrophobic membrane.

Isopropyl alcohol of the isopropyl alcohol cleaning solution will exist in a vapor form at the interface between the hydrophobic membrane surface and the liquid surface of the isopropyl alcohol cleaning solution. Because the isopropyl alcohol cleaning solution does not wet the surface of the membrane, isopropyl alcohol molecules of the vapor are allowed to enter pores of the membrane and pass through the membrane as a vapor. Upon passing through the membrane to an opposite side of the membrane (a permeate side of the membrane), the isopropyl alcohol vapor can be collected. The dissolved metal and the non-volatile organic components that are present in the isopropyl alcohol cleaning solution (liquid feed) on the retentate side of the membrane do not pass through the membrane and remain on the retentate side of the membrane.

Referring to FIG. 1, an example of membrane distillation device 100 includes body 110 that contains hydrophobic membrane 112. Body 110 defines feed flow space 114 on retentate side 116 (or "high pressure side") of hydrophobic membrane 112, and permeate space 118 on permeate side 120 (or "low pressure side") of hydrophobic membrane 112. Liquid feed inlet 122 is in fluid communication with feed flow space 114, to allow a flow of incoming liquid feed 130 (as described herein) into feed flow space 114.

At least the surface of hydrophobic membrane 112 that faces toward retentate side 116 is sufficiently hydrophobic to prevent the surface from becoming wetted by contact with liquid feed 130. Membrane 112 may be in the form of a flat sheet, hollow tubular membranes, or any other useful configuration. For a membrane 112 that is in the form of a hollow tubular membrane, at least an outside wall of the membrane includes a hydrophobic surface as described, and that outside wall can be located toward feed flow space 114 to contact liquid feed 130 flowing through feed flow space 114; an inside wall of the hollow tubular membrane can be located toward permeate space 118.

Liquid feed 130 may be any liquid feed described herein, for example an isopropyl cleaning solution that contains substantially only isopropyl alcohol, non-volatile organic residue, and one or more dissolved metals. Liquid feed 130 is contained in feed flow space 114 in the form of a liquid that does not wet retentate side 116 of hydrophobic membrane 112. However, isopropyl alcohol molecules 132 (or another volatile organic liquid component of a liquid feed) can exist in a vapor form within feed flow space 114, at an interface between retentate side 116 of hydrophobic membrane 112 and a liquid surface (not specifically shown) of liquid feed 130. Isopropyl alcohol molecules 132 in vapor form flow as a vapor through pores 124 in hydrophobic membrane 112.

Non-volatile organic residue, dissolved metal, or both (126), remain within the liquid phase of liquid feed composition 130, are not present in a vapor form, and do not pass through hydrophobic membrane 112. Liquid feed 130 that flows over or past membrane 112 through feed flow space 114 and does not pass through hydrophobic membrane 112 becomes retentate 142, which exits feed flow space 114 through liquid feed outlet 150.

During operation, liquid feed 130 flows into feed flow space 114 and contacts a surface of hydrophobic membrane 112 on retentate side 116, but does not wet the surface. When in contact with the hydrophobic surface of hydrophobic membrane 112, and without wetting the hydrophobic surface, volatile organic liquid of liquid feed 130 vaporizes to form gaseous molecules that pass through hydrophobic membrane 112 (see arrows) to be released from the membrane in the form of a vapor (in molecular form) on permeate side 124 of hydrophobic membrane 112. Vapor of the volatile organic liquid (e.g., isopropyl alcohol molecules) 132 that passes through to permeate side 118 can be collected and processed as desired, such as by condensation.

As desired, liquid feed 130 may be heated to a temperature that will facilitate movement of volatile organic vapor (e.g., isopropyl alcohol) through hydrophobic membrane 112, e.g., to a temperature in a range of from 20 to 78 degrees Celsius.

The hydrophobic membrane contains a porous base membrane ("base membrane") that includes a base membrane surface to which fluorinated groups have been added to reduce the surface energy of the base membrane surface, i.e., to cause the surface to have an increased hydrophobicity and decreased hydrophilicity. After the fluorinated groups have been added, the surface is hydrophobic or strongly hydrophobic, e.g., will have a surface energy that is below 47, 30, 22, or 20 mN/m, as determined by a standard wetting liquid test.

According to certain specific example embodiments, a base membrane surface is hydrophilic before the fluorinated groups are added, e.g., the base membrane surface has a surface energy of at least 42 mN/m before the fluorinated groups are added.

A base membrane that has a hydrophilic surface may be prepared by forming the base membrane from hydrophilic polymer ("hydrophilic base polymer") such as nylon. In such instances, with hydrophilic polymer forming the base membrane and base membrane surface, that surface may be hydrophilic, e.g., may have a surface energy of at least 47 mN/m.

According to other example embodiments, a base membrane that includes a hydrophilic surface may be produced from a membrane that is made of hydrophobic polymer, and that initially has a hydrophobic surface (e.g., a surface that exhibits a surface energy below 40 mN/m), by treating the hydrophobic surface by a method that increases the surface energy of the hydrophobic surface. For example, a base membrane having a hydrophilic surface may be prepared by preparing a membrane from hydrophobic polymer ("hydrophobic base polymer"); the membrane will initially include a membrane surface having a surface energy of below 40 mN/m. That hydrophobic surface may be treated, e.g., by known methods, to increase the surface energy of the membrane surface to be more hydrophilic, to produce a base membrane having a hydrophilic surface, e.g., a surface with a surface energy above 40 mN/m, but made of an underlying hydrophobic polymer.

Methods of increasing a surface energy of a membrane surface are sometimes referred to as methods of "hydrophilizing" the surface. According to methods and membranes as described, a membrane surface that is initially hydrophobic, e.g., that has a surface energy below 40 mN/m, may be treated (hydrophilized) to increase the surface energy to be above 40 mN/m, e.g., to a surface energy of at least 42, 47, 50, 60, or 70 mN/m. After the surface energy has been increased to this range, the membrane surface may be treated to add fluorinated groups to cause the surface to be hydrophobic or strongly hydrophobic, e.g., to have a surface energy below 50, 47, 30, 22, or 20 mN/m.

Figure 2:
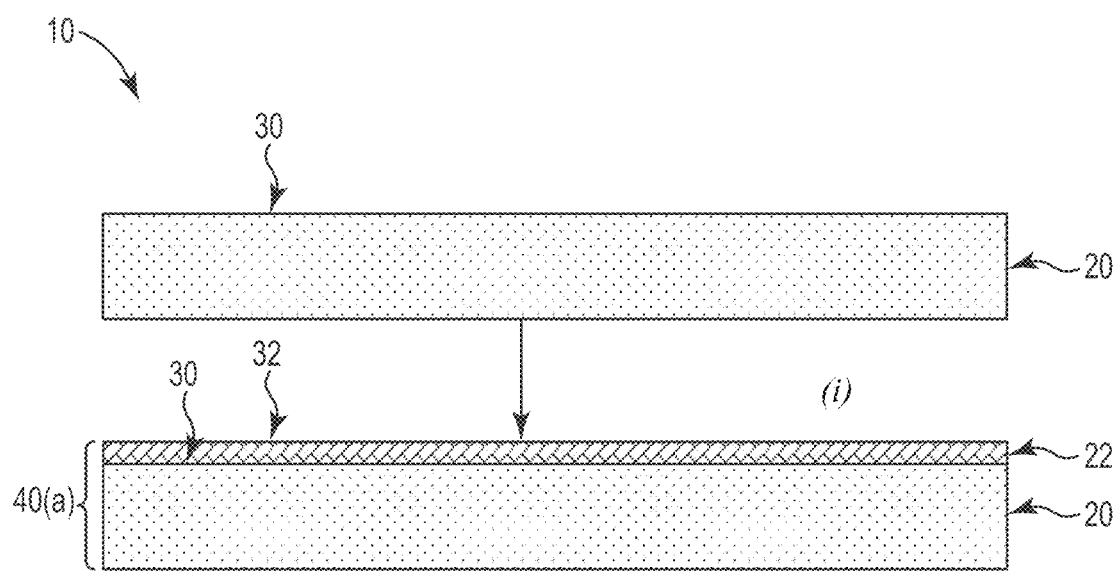
FIGS. 2 and 3 illustrate examples of methods of preparing hydrophobic membranes of the description.
Figure 3:
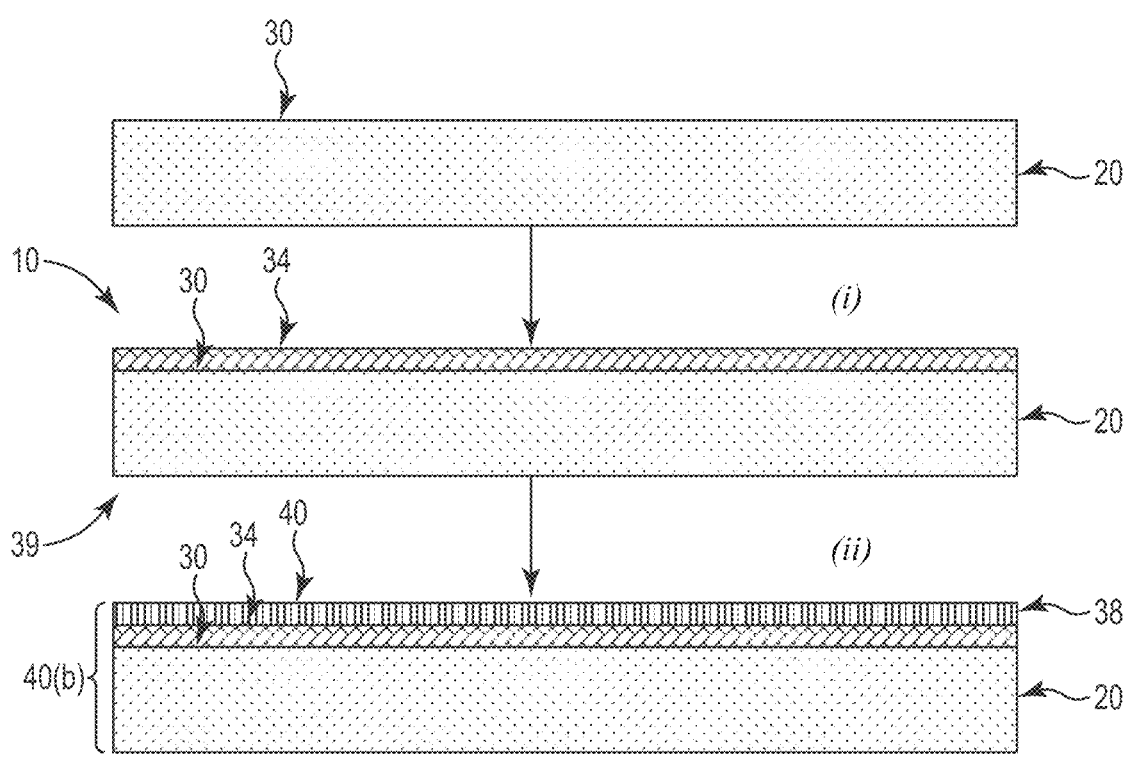

Examples of methods of producing a hydrophobic membrane as described are shown at FIGS. 2 and 3. Referring to FIG. 2, base membrane 20 is made of hydrophilic polymer (e.g., nylon), and base membrane surface 30 is hydrophilic. In step (i), fluorinated material 22 is chemically added to hydrophilic surface 30 of base membrane 20, to produce hydrophobic surface 32 of hydrophobic membrane 40(a).

Referring to FIG. 3, membrane 20 is made of hydrophobic polymer (e.g., polyolefin), and includes membrane surface 30, which is initially hydrophobic. In step (i), hydrophobic surface 30 is treated, i.e., is "hydrophilized," to make hydrophilic surface 34. Resulting base membrane 39 include hydrophobic membrane 20 and hydrophilic ("hydrophilized") surface 34. In a subsequent step (ii), fluorinated material 38 is chemically added to hydrophilic surface 34 of base membrane 39, to produce hydrophobic surface 40 of hydrophobic membrane 40(b). Surface energy of membrane surfaces is a well-known concept that relates to wetting characteristics of a surface of a solid material. Surface energy of a membrane can be measured using standard tests such as using standard test liquids, contact angle measurement of a drop of a liquid with a known surface tension, among others. Surface energy is measured in units of force per unit length, e.g., mN/m. For membranes, a higher surface energy means that the membrane is more hydrophilic (or less hydrophobic) and is more easily wet with a liquid. A lower surface energy means that the membrane is less hydrophilic (or more hydrophobic) and wets less easily.

In general terms, a useful or preferred hydrophobic membrane of the present description may have a hydrophobic surface that exhibits a surface energy that will allow the membrane to be used in a method as described, with a liquid feed that contains an amount of volatile organic compound, while the liquid feed does not wet the hydrophobic surface of the membrane. Examples of useful or preferred surface energies of hydrophobic surfaces of a hydrophobic membrane as described may be below 50 mN/m, e.g., below 40, 30, 25, 22, 21, or 20 mN/m, e.g., as measured by a standard wetting liquid test.

All surface tension and surface energy values reported herein are determined at room temperature unless otherwise stated. All surface energy values reported herein are determined using a standard liquid test, unless otherwise stated.

The hydrophobic membrane may be in the form of a "sheet" or a "film" that includes two opposed major surfaces and a thickness between the two surfaces, with at least one of the surfaces being hydrophobic as described herein. Alternately, the hydrophobic membrane may be in the form of a hollow fiber tube having an inner hollow opening, and inner sidewall, an outer sidewall, and a thickness between the inner and the outer sidewalls. At least one surface of the hollow fiber tube is hydrophobic as described herein, e.g., a surface of the outer sidewall.

The hydrophobic membrane may be selected to provide desired physical features that include porosity, pore size, bubble point, and thickness.

The hydrophobic membrane can have any thickness that allows the hydrophobic membrane to perform according to a method of the present description. Useful or preferred thicknesses can be in a range from 5 to 300 microns, e.g., from 10 or 20 to 50, 100, or 200 microns; these ranges are useful for various forms of membranes, include a sheet membrane and a hollow fiber tube membrane.

The hydrophobic membrane may have any porosity that will allow the membrane to be effective as described herein, for use in a membrane distillation method. Example porous membranes can have a porosity over a range of from 30 to 90 percent, e.g., a porosity in a range from 40 to 80 percent (volume). As used herein, and in the art of porous membranes, a "porosity" of a porous membrane (also sometimes referred to as void fraction) is a measure of the void (i.e. "empty") space in the membrane as a percent of the total volume of the membrane, and is calculated as a fraction of the volume of voids of the membrane over the total volume of the membrane. A body that has zero percent porosity is completely porous solid.

A porosimetry bubble point test is a test of a porous membrane that measures a pressure required to push air through the pores of the membrane, after the membrane is wetted with a particular liquid. A bubble point test is a well-known method for determining the pore size of a membrane. Useful or preferred hydrophobic membranes of the present description may have porosimetry bubble point in a range from 5 to 200 pounds per square inch, measured by an ethoxy-nonafluorobutane bubble point test [is this mean?].

The hydrophobic membrane is made of a base membrane that has a surface to which are added fluorinated groups to produce a hydrophobic or strongly hydrophobic surface at the surface.

A variety of different polymers are available to form the base membrane. These include hydrophilic polymers, as well as hydrophobic polymers that can be hydrophilized before adding the fluorinated groups. Non-limiting examples of polymers that may be used for preparing a base membrane including polyolefins (e.g., polypropylene, polyethylene, polyhaloolefins), polyesters, polyimides, polyetherimides, polysulfones, polyethersulfones, polycarbonates, regenerated cellulose, mixed cellulose esters and agarose, as well as fluoropolymers, and other general and specific types of useful polymers.

More specific examples of hydrophobic polymers include: polyethylene (e.g., ultra-high molecular weight polyethylene (UPE)), polypropylene, alpha-polyolefins, poly-3-methyl-1-butene, poly-4-methyl-1-butene, and copolymers of ethylene, propylene, 3-methyl-1-butene, or 4-methyl-1-butene with each other or with minor amounts of other olefins; polyhaloolefins such as polytetrafluoroethylene, polyvinylidene fluoride, and co-polymers of these and other fluorinated or non-fluorinated monomers.

Suitable hydrophilic polymers include nylon, e.g., polyesters such as polyethylene terephthalate and polybutylene terephthalate, as well as related co-polymers, any of which may be useful to form a base membrane that has a surface energy of at least 47, 50, 60, 70, or 72 mN/m or higher without being hydrophilized.

The fluorinated groups can be added to a surface of a base membrane that has a surface energy of at least 42, 47, 50, 60, or 70 mN/m, to reduce the surface energy of the surface to a level that is hydrophobic or strongly hydrophobic, e.g., to below 42, 40, 30, 25, 22, or 20 mN/m.

Example methods of adding fluorinated groups to a base membrane surface include grafting techniques by which fluorinated groups are chemically bonded to a surface of a base membrane, as well as "gel polymerization" techniques that form a crosslinked polymer network that contains fluorinated groups on a surface of a base membrane without the network becoming chemically attached (chemically bonded) to the surface.

Examples of useful fluorinated groups include perfluoroalkyl groups, such as perfluorooctyl groups, perfluorohexyl groups, and the like. The fluorinated groups can be derived from a fluorinated monomer such as a fluorinated (e.g., perfluorinated) acrylate, e.g., perfluorooctyl acrylate. Example perfluoroacrylate monomers and methods of applying perfluoroacrylate monomers to a porous membrane are also described in International (PCT) Patent Publication WO 2017/161241, the entirety of which is incorporated herein by reference. Monomers of that description include perfluoroacrylate monomers that contain a perfluoro-alkyl group that is: perfluoro-propyl, perfluoro-butyl, perfluoro-sec-butyl, perfluoro-t-butyl, perfluoro-pentyl, perfluoro-hexyl, perfluoro-n-heptyl, perfluoro-octyl, perfluoro-nonyl, perfluoro-decyl, perfluoro-undecyl, perfluoro-dodecyl, perfluoro-tridecyl, perfluoro-tetradecyl, perfluoro-pentadecyl, perfluoro-hexadecyl, perfluoro-heptadecyl, perfluoro-octadecyl, perfluoro-nonadecyl, perfluoro-icosadecyl, perfluoro-2-methylbutyl, perfluoro-2-methylpentyl, perfluoro-2-ethylbutyl, perfluoro-3-methylpentyl, perfluoro-4-methylpentyl. According to grafting techniques, fluorinated groups can be attached chemically (i.e., grafted, covalently chemically bonded) to polymer chains of polymer material that forms a surface of a base membrane. If the base membrane is made of nylon, for example, the fluorinated groups are chemically bonded to nylon polymer of the base membrane surface. The fluorinated groups can be derived from fluorinated monomers that become chemically attached to the surface of the base membrane by a chemical reaction that involves UV-initiated reaction of the fluorinated monomers with the polymeric surface of the base membrane. The fluorinated monomers react with and become chemically attached to polymer of the base membrane surface. Optionally, in combination with one or more optional co-monomers, the fluorinated monomers may react to form a side-chain attached to polymeric material of the base membrane surface. A length of the side-chain (i.e., the number of fluorinated monomers and optional co-monomers of the side-chain) may be any useful length, such as from 5 to 1000 monomers, or from 10 to 100 or 500 monomers.

According to techniques of forming a crosslinked polymer network coating at a surface of a porous membrane, sometimes referred to as "gel polymerization techniques," a polymeric network is formed from monomers that include fluorinated monomers and crosslinker, e.g., a di-functional crosslinking molecule such as a di-functional acrylate compound, which are reacted to form a polymerized, crosslinked coating in the presence of UV radiation and a UV initiator.

The crosslinked polymer network coating, which contains fluorinated groups, is formed over surfaces of the membrane, without the coating or the fluorinated groups becoming chemically bonded to polymer of the membrane.

Example 1

This example demonstrates the preparation of surface modification solution containing monomer and crosslinker to form coating and decrease membrane surface energy.

In a representative experiment, a solution was made at room temperature containing: 0.72% Irgacure 651, 7% Zonyl TAN (copolymer perfluoroalkylethyl acrylate/ester perfluorohexylethyl acrylate), 1% Hexanediol diacrylate crosslinker and 91.28% Decamethyl tetrasiloxane.

Example 2

This example demonstrates the preparation of surface modification solution containing monomer and crosslinker to form coating and increase membrane surface energy.

In a representative experiment, a solution was made at room temperature containing: 0.4% Irgacure 2959, 7% Dimethylacrylamide, 3% methylenebisacrylamide crosslinker and 89.6% DI water.

Example 3

This example demonstrates how a Nylon membrane is surface modified with a coating having polymerized and crosslinked Zonyl TAN polymer.

In a representative experiment, a sheet of Nylon membrane (54 psi HFE bubble point, 175 micron thick) was soaked in the solution from Example 1 for 2 minutes. The membrane sheet was removed and placed between 1 mil polyethylene sheets. The excess solution was removed by rolling a rubber roller over the polyethylene/membrane sheet/polyethylene sandwich as it lays flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 10 feet per minute. After emerging from the UV unit, the membrane was removed from the sandwich and immediately placed in Isopropyl alcohol (IPA) for 5 minutes. Following this washing procedure, the membrane was dried on a holder in an oven operating at 50° C. for 10 min.

The membrane prepared according to this procedure did not wet in 100% IPA (surface tension of 21.7 dyne/cm) and Hexane (surface tension 18.4 dyne/cm) but wets in 100% pentane suggesting a membrane surface tension of 15.8 dyne/cm.

Example 4—Surface Energy Measurement

A liquid will wet a porous polymeric membrane when the surface tension of the liquid is less than the surface free energy of the membrane. For purposes of this disclosure, a porous membrane is wet by a liquid when the membrane is placed in contact with the highest surface tension liquid within a series of inert (standard) liquids, and the membrane spontaneously wicks a liquid within 2 seconds or less without the application of external pressure.

Figure 4:
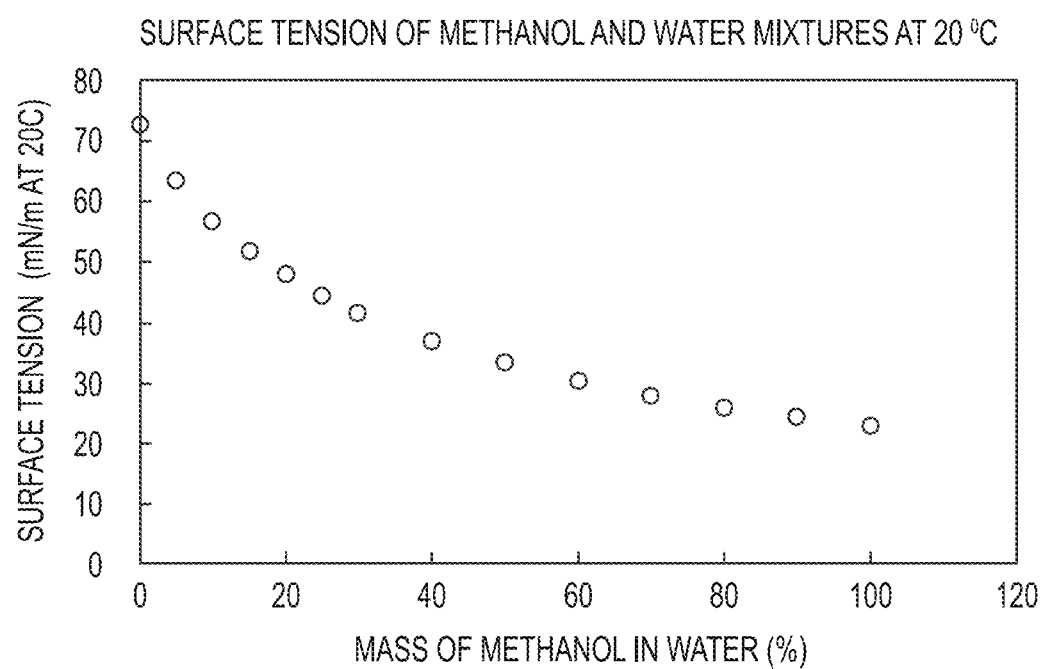
FIG. 4 shows surface tensions of mixtures of methanol and water.

In a representative example, a series of inert (standard) liquids was prepared by mixing methanol and water at different mass ratios. The surface tension of the resulting liquids is depicted in FIG. 4 (Plotted using surface tension data published in Lange's Handbook of Chemistry 11 edition).

A 47 mm disc of nylon membrane (54 psi HFE bubble point, 175 microns thick) was placed in contact with the inert liquids, one liquid at a time; in a beaker. For each liquid, the amount of time required for the membrane to spontaneously wick the liquid was recorded. As illustrated in Table 1, a liquid of 15% Methanol with 51.83 mN/m surface tension was the highest surface tension liquid that wet the membrane within 2 seconds or less.

TABLE 1

| Mass of methanol in water (%) | Surface Tension (mN/m) at 20° C. | Time to wet membrane (sec) |
| --- | --- | --- |
| 0 | 72.75 | 5.3 |
| 5 | 63.47 | 4 |
| 10 | 56.87 | 3.5 |
| 15 | 51.83 | 2.0 |
| 20 | 47.86 | 1.8 |
| 25 | 44.38 | <1 |

Example 5

This example demonstrates how a UPE membrane is surface modified with a coating having polymerized and crosslinked hydrophilic coating and Zonyl TAN polymer.

In a representative experiment, a sheet of asymmetric UPE membrane (121 psi HFE bubble point, 80 micron thick) was soaked in the solution from Example 2 for 2 minutes. The membrane sheet was removed and placed between 1 mil polyethylene sheets. The excess solution was removed by rolling a rubber roller over the polyethylene/membrane sheet/polyethylene sandwich as it lays flat on a table. The polyethylene sandwich was exposed to UV light at wavelengths ranging from 200 to 600 nm at a rate of 10 feet per minute. After emerging from the UV unit, the membrane was removed from the sandwich and immediately placed in DI water; where the membrane was washed by soaking for 5 minutes. Next, the treated membrane sample was washed in isopropyl alcohol for 5 minutes. Following this washing procedure, the membrane was dried on a holder in an oven operating at 50° C. for 10 min.

The surface energy of the membrane prepared according to this procedure was tested as outlined in Example 4. The asymmetric membrane had a surface energy of 47.9 mN/m on the tight side (i.e. the side of the membrane with small pores) and 63.5 mN/m on the open side (i.e. the side of the membrane with large pores).

The membrane sheet was further soaked in a solution comprising: 1.08% Irgacure 651, 13% Zonyl TAN (copolymer perfluoroalkylethyl acrylate/ester perfluorohexylethyl acrylate), 1.9% Hexanediol diacrylate crosslinker and 84.02% Decamethyl tetrasiloxane, for 2 minutes. The membrane sheet was removed and placed between 1 mil polyethylene sheets. The excess solution was removed by rolling a rubber roller over the polyethylene/membrane sheet/polyethylene sandwich as it lays flat on a table. The polyethylene was exposed to UV light at wavelengths ranging from 200 to 600 nm at a rate at 10 feet per minute. The membrane was then removed from the sandwich and immediately placed in 100% IPA water; where the membrane was washed by soaking for 5 minutes. Following this washing procedure, the membrane was dried on a holder in an oven operating at 50° C. for 10 min.

Both tight and open sides of the membrane prepared according to this procedure did not wet in 100% IPA (surface tension of 21.7 mN/m) and Hexane (surface tension 18.4 mN/m). The open side of the membrane (side of the membrane with large pores) wets in 100% pentane (15.8 dyne/cm) but the tight side of the membrane (side of the membrane with small pores) did not wet in 100% pentane.

Example 6

Figure 5:
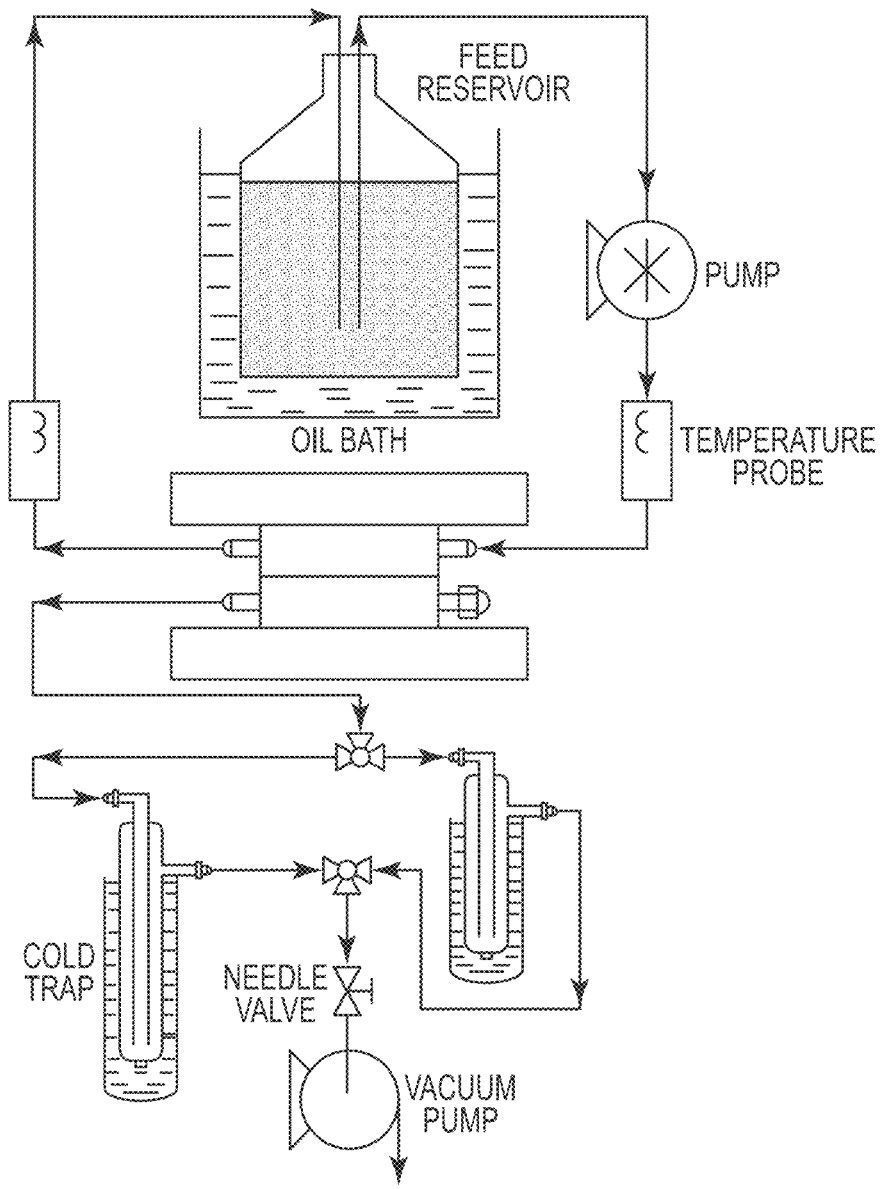
FIG. 5: Shows an example of a Vacuum membrane distillation process

This example demonstrates how a membrane distillation system like the one depicted in FIG. 5 can be used to purify a solution of IPA spiked with Hydrocarbon model impurities (C7-C30).

500 g of feed solution at concentration of 2 ppm was prepared by spiking 1 g of Hydrocarbon standard (49451-U, 1000 ppm, Sigma) in Isopropyl alcohol. The solution was heated in a feed reservoir to 45° C. using an oil bath and was pumped into a stainless steel cross flow cell containing the membrane from Example 5 at a flow rate of 50 ml/min and recycled back into the feed reservoir. A vacuum pump was used to pull 5 in Hg vacuum across the membrane in the flow cell and transfer the IPA vapor through two parallel condensers to collect 1.33 g of condensed permeate.

The concentration of hydrocarbon impurities in the feed and condensate samples was quantified using a 7890B Series GC system with an 5977A MSD Detector.

Figure 6:
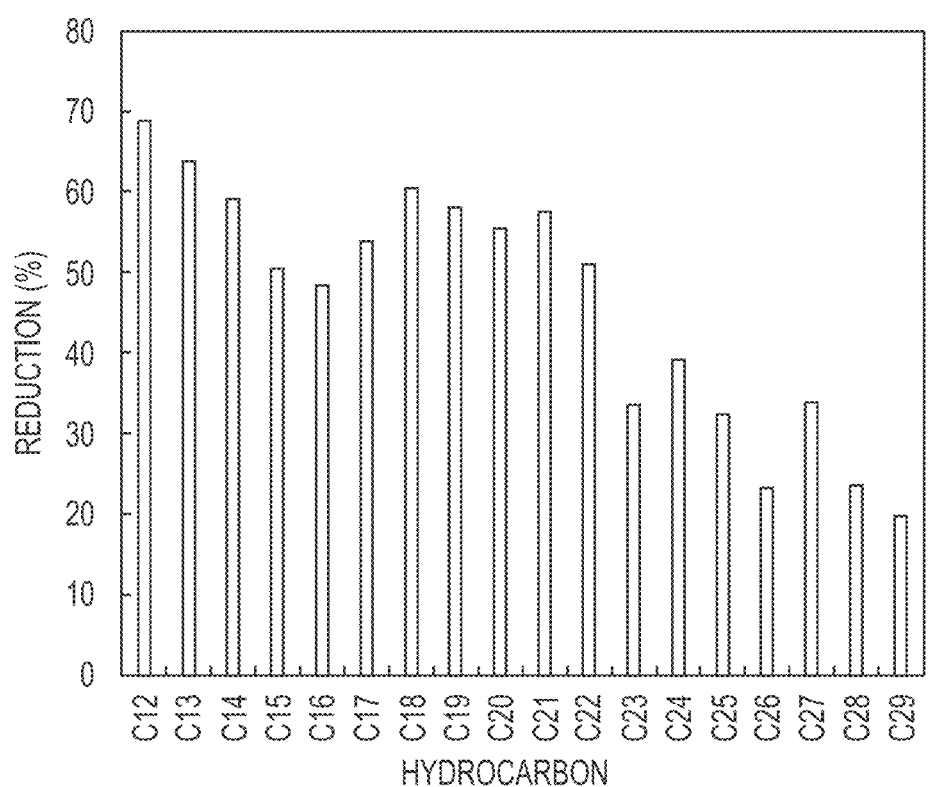
FIG. 6: Shows Hydrocarbon impurity reduction in IPA solution by a single layer porous polymeric membrane prepared according to Example 5

FIG. 6 demonstrates that the concentration of hydrocarbons decreased in the permeate with a removal efficiency in the 19-70% range.

Example 7

This example demonstrates how a UPE membrane is surface modified with a coating having polymerized and crosslinked Zonyl TAN polymer.

In a representative experiment, a sheet of asymmetric UPE membrane (121 psi bubble point, 80 micron thick) was soaked in a solution comprising: 1.08% Irgacure 651, 13% Zonyl TAN (copolymer perfluoroalkylethyl acrylate/ester perfluorohexylethyl acrylate), 1.9% Hexanediol diacrylate crosslinker and 84.02% Decamethyl tetrasiloxane, for 2 minutes. The membrane sheet was removed and placed between 1 mil polyethylene sheets. The excess solution was removed by rolling a rubber roller over the polyethylene/membrane sheet/polyethylene sandwich as it lays flat on a table. The polyethylene sandwich was exposed to UV light at wavelengths ranging from 200 to 600 nm at a rate of 10 feet per minute. The membrane was then removed from the sandwich and immediately placed in 100% IPA water; where the membrane was washed by soaking for 5 minutes. Following this washing procedure, the membrane was dried on a holder in an oven operating at 50° C. for 10 min.

The open side of the membrane (side of the membrane with large pores) wets in 95% Methanol (23.6 mN/m surface energy) and the tight side of the membrane (side of the membrane with small pores) wets in 90% Methanol (24.4 mN/m).

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

The invention claimed is:

1. A hydrophobic distillation membrane having a hydrophobic surface, the membrane comprising:
   a base membrane comprising a base membrane surface having a surface energy of at least 47 mN/m, and
   fluorinated groups added at the base membrane surface to produce the hydrophobic surface, the hydrophobic surface having a surface energy below 20 mN/m.

2. The membrane of claim 1, wherein the base membrane comprises nylon and the base membrane surface has a surface energy of at least 50 mN/m.

3. The membrane of claim 1, wherein the base membrane comprises hydrophobic polymer and the base membrane surface is a hydrophilized surface.

4. The membrane of claim 1, wherein the hydrophobic surface does not become wetted by 100 percent isopropyl alcohol at a temperature of 72 degrees Fahrenheit (22.2 degrees Celsius) and ambient pressure.

5. The membrane of claim 1, wherein the fluorinated groups are perfluoroalkyl groups.

6. The membrane of claim 1 having:
   a porosity of from 30 to 90 percent (volume), or
   a thickness in a range from 5 to 300 microns, or
   a bubble point in a range from 5 to 200 pounds per square inch, measured by an ethoxy-nonafluorobutane bubble point test, or
   two or three of these.

7. A separation apparatus comprising:
   a hydrophobic membrane as recited by claim 1,
   a retentate space on a retentate side of the membrane,
   a permeate space on a permeate side of the membrane,
   a liquid feed inlet in communication with the retentate space,
   a retentate outlet in communication with the retentate space, and
   a permeate outlet in communication with the permeate space.

* * * * *